(12) United States Patent
Bretschneider et al.

(10) Patent No.: US 11,054,893 B2
(45) Date of Patent: Jul. 6, 2021

(54) TEAM FLOW CONTROL IN A MIXED PHYSICAL AND VIRTUAL REALITY ENVIRONMENT

(71) Applicant: VR Exit LLC, Fort Lauderdale, FL (US)

(72) Inventors: Ken Bretschneider, Pleasant Grove, UT (US); Curtis Hickman, Pleasant Grove, UT (US); James Jensen, American Fork, UT (US)

(73) Assignee: VR Exit LLC, Fort Lauderdale, FL (US)

( * ) Notice: Subject to any disclaimer, the term of this patent is extended or adjusted under 35 U.S.C. 154(b) by 0 days.

(21) Appl. No.: 15/624,716

(22) Filed: Jun. 16, 2017

(65) Prior Publication Data
US 2017/0285733 A1    Oct. 5, 2017

Related U.S. Application Data

(63) Continuation-in-part of application No. 14/942,878, filed on Nov. 16, 2015.
(Continued)

(51) Int. Cl.
| | |
|---|---|
| *G06F 3/01* | (2006.01) |
| *A63F 13/212* | (2014.01) |
| *G06T 19/00* | (2011.01) |
| *A63F 13/428* | (2014.01) |
| *A63F 13/285* | (2014.01) |

(Continued)

(52) U.S. Cl.
CPC ............ *G06F 3/011* (2013.01); *A63F 13/212* (2014.09); *A63F 13/285* (2014.09); *A63F 13/323* (2014.09); *A63F 13/327* (2014.09); *A63F 13/428* (2014.09); *A63F 13/69* (2014.09); *G06T 19/006* (2013.01); *G09B 9/00* (2013.01)

(58) Field of Classification Search
CPC combination set(s) only.
See application file for complete search history.

(56) References Cited

U.S. PATENT DOCUMENTS

| | | |
|---|---|---|
| 5,633,742 A | 5/1997 | Shipley |
| 6,069,583 A | 5/2000 | Silvestrin et al. |

(Continued)

OTHER PUBLICATIONS

Nescher et al., "Planning Redirection Techniques for Optimal Free Walking Experience using model Predictive Control", 2014 IEEE Symposium on 3D User Interface, Mar. 29-30, 2014, pp. 111-118.

(Continued)

*Primary Examiner* — Motilewa Good Johnson
(74) *Attorney, Agent, or Firm* — Sunstein LLP

(57) ABSTRACT

The flow of teams of one or more players is controlled through different geographical areas of a mixed virtual reality and physical experience that takes place on an attraction stage. The geographical areas may include rooms, compartments, or other geographical areas through which a team may progress. Within each geographical area, a team may engage in an experience and accomplish one or more checkpoints. Based on the time to achieve each checkpoint, the experience may be shortened or lengthened, either within the particular geographical area or the experience as a whole, to control the flow of the particular team through the series of geographical areas.

23 Claims, 15 Drawing Sheets

Related U.S. Application Data

(60) Provisional application No. 62/080,308, filed on Nov. 15, 2014, provisional application No. 62/080,307, filed on Nov. 15, 2014.

(51) Int. Cl.
  *A63F 13/323* (2014.01)
  *A63F 13/327* (2014.01)
  *G09B 9/00* (2006.01)
  *A63F 13/69* (2014.01)

(56) References Cited

U.S. PATENT DOCUMENTS

| | | | |
|---|---|---|---|
| 6,073,489 | A | 6/2000 | French et al. |
| 6,430,997 | B1 | 8/2002 | French et al. |
| 7,269,632 | B2 | 9/2007 | Edeker |
| 9,132,342 | B2 | 9/2015 | Balachandreswaran et al. |
| 9,159,152 | B1 | 10/2015 | Glover et al. |
| 9,286,711 | B2 | 3/2016 | Geisner et al. |
| 9,364,746 | B2* | 6/2016 | Chudley ............ A63F 13/10 |
| 9,721,386 | B1* | 8/2017 | Worley, III ......... G06T 19/006 |
| 9,767,720 | B2 | 9/2017 | Kinnebrew |
| 10,137,376 | B2* | 11/2018 | Kohler ............. H04N 21/4402 |
| 10,311,679 | B2 | 6/2019 | Washington et al. |
| 2003/0071733 | A1 | 4/2003 | Hall et al. |
| 2003/0077556 | A1 | 4/2003 | French et al. |
| 2006/0017654 | A1 | 1/2006 | Romo |
| 2006/0088081 | A1 | 4/2006 | Withington et al. |
| 2006/0211462 | A1 | 9/2006 | French et al. |
| 2006/0287025 | A1 | 12/2006 | French |
| 2007/0031148 | A1 | 2/2007 | Li et al. |
| 2007/0066403 | A1* | 3/2007 | Conkwright ......... A63F 13/10 463/43 |
| 2009/0028258 | A1 | 1/2009 | Ma et al. |
| 2009/0187389 | A1 | 7/2009 | Dobbins |
| 2010/0261527 | A1* | 10/2010 | Steiner ............. A63F 13/42 463/36 |
| 2010/0287500 | A1 | 11/2010 | Whitlow et al. |
| 2011/0090065 | A1 | 4/2011 | Overhultz et al. |
| 2011/0281638 | A1* | 11/2011 | Bansi ............. A63F 13/69 463/23 |
| 2012/0021825 | A1* | 1/2012 | Harp ............. A63F 13/12 463/30 |
| 2012/0142415 | A1 | 6/2012 | Lindsay |
| 2012/0249741 | A1 | 10/2012 | Maciocci et al. |
| 2012/0307943 | A1 | 12/2012 | Umeda et al. |
| 2013/0116046 | A1* | 5/2013 | Manton ............. A63F 13/00 463/31 |
| 2013/0225305 | A1 | 8/2013 | Yang |
| 2013/0260896 | A1* | 10/2013 | Miura ............. A63F 13/12 463/42 |
| 2014/0179428 | A1* | 6/2014 | Miura ............. A63F 13/12 463/31 |
| 2014/0254466 | A1 | 9/2014 | Wurster et al. |
| 2015/0262208 | A1 | 9/2015 | Bjontegard |
| 2015/0278263 | A1* | 10/2015 | Bowles ............. A63F 13/219 463/43 |
| 2016/0026253 | A1 | 1/2016 | Bradski et al. |
| 2016/0041391 | A1 | 2/2016 | Van Curen et al. |
| 2016/0048787 | A1* | 2/2016 | Kaminsky ........ G06Q 10/06314 705/7.24 |
| 2016/0067609 | A1* | 3/2016 | Fahmie ............. A63F 13/60 463/29 |
| 2016/0292924 | A1 | 10/2016 | Balachandreswaran et al. |
| 2017/0173466 | A1* | 6/2017 | Fahmie ............. A63F 13/30 |
| 2017/0235848 | A1 | 8/2017 | Van et al. |
| 2019/0009177 | A1* | 1/2019 | Fahmie ............. A63K 1/00 |

OTHER PUBLICATIONS

PCT Application No. PCT/US2017/038000 International Search Report and Written Opinion dated Jul. 6, 2017.

Steinicke et al., "Estimation of detection thresholds for redirected walking techniques", IEEE Transactions on Visualization and Computer Graphics, Jan./Feb. 2010, vol. 16, No. 1, pp. 17-27.

Eric Hodgson and Eric Bachmann, "Comparing Four Approaches to Generalized Redirected Walking: Simulation and Live User Data," IEEE Transactions on Visualization and Computer Graphics, vol. 19 (4), Apr. 2013, pp. 634-643.

Final Office Action from U.S. Apple. No. 14/942,878, dated Mar. 16, 2018, 17 pages.

Final Office Action from U.S. Apple. No. 15/183,839, dated Dec. 19, 2018, 37 pages.

Final Office Action from U.S. Apple. No. 15/183,839, dated Oct. 11, 2017, 62 pages.

International Preliminary Report on Patentability for Application No. PCT/US2017/038000 dated Dec. 18, 2018, 11 pages.

International Search Report and Written Opinion for Application No. PCT/US2017/038000 dated Jul. 6, 2017, 14 pages.

Non-final Office Action from U.S. Apple. No. 14/942,878, dated Feb. 25, 2019, 22 pages.

Non-final Office Action from U.S. Apple. No. 14/942,878, dated Oct. 31, 2016, 12 pages.

Non-final Office Action from U.S. Apple. No. 15/068,567, dated Jan. 12, 2018, 19 pages.

Non-final Office Action from U.S. Apple. No. 15/068,568, dated Jan. 12, 2018, 22 pages.

Non-final Office Action from U.S. Apple. No. 15/183,839, dated Jun. 5, 2018, 21 pages.

Non-final Office Action from U.S. Apple. No. 15/183,839, dated Mar. 22, 2017, 24 pages.

Office Action from U.S. Apple. No. 14/942,878, dated Jul. 24, 2017, 5 pages.

Razzaque S., "Redirected Walking," Doctoral Dissertation, University of North Carolina, Chapel Hill, 2005, 202 pages.

C. Neth, et al., "Velocity-dependent curvature gain and avatar use for Redirected Walking", Joint Virtual Reality Conf. of EuroVR-EGVE-VEC (2010), pp. 1-2 (Year: 2010).

E.A. Suma, Z. Lipps, S. Finkelstein, D. 'M. Krum and M. Bolas, "Impossible Spaces: Maximizing Natural Walking in Virtual Environments with Self-Overlapping Architecture," IEEE Trans. Vis. Comput. Graphs., vol. 18, No. 4, pp. 555-564, 2012 (Year: 2012).

Final Office Action received for U.S. Appl. No. 14/942,878, dated Oct. 1, 2019, 18 pages.

Final Office Action, U.S. Appl. No. 15/183,839, dated Jan. 9, 2020, 46 pages.

Matsumoto, et. al, "Unlimited Corridor: Redirected Walking Techniques using Visuo Haptic Interaction", SIGGRAPH '16 Emerging Technologies, Jul. 24-28, 2016, Anaheim CA, ACM978-1-4503-4372-May 7, 2016, pp. 1-2 (Year: 2016).

MPIVideoProject, "Using Avatars for Redirected Walking", Youtube video, published Apr. 14, 2011, pp. 1-2, at https://www.youtube.com/watch?v=Xm1 LrQ32kDg (Year: 2011).

Non-Final Office Action, U.S. Appl. No. 15/183,839, dated Aug. 8, 2019, 48 pages.

Razzaque, S., Kohn, Z., & Whitton, M. C., "Redirected walking", Proceedings of Eurographics, vol. 9, Sep. 2001, pp. 105-106 (Year 2001).

Walker, James, Redirected Walking in Virtual Environments. Michigan Technological University, 2013, pp. 1-12 at https:// pdfs.semanticscholar.org/6dac/eaebf0bc569621163eal5ff166c3f05b3c00.pdf (Year: 2013).

Non-Final Office Action, U.S. Appl. No. 14/942,878, dated Jun. 8, 2020, 25 pages.

\* cited by examiner

TEAM FLOW CONTROL IN A MIXED PHYSICAL AND VIRTUAL REALITY ENVIRONMENT

CROSS REFERENCE TO RELATED APPLICATIONS

This application is a continuation in part and claims the priority benefit of U.S. patent application Ser. No. 14/942,878, titled "Combined Virtual and Physical Environment," filed Nov. 15, 2015, which claims the priority benefit of U.S. provisional application 62/080,308, titled "Systems and Methods for Creating Combined Virtual and Physical Environments," filed Nov. 15, 2014, and U.S. provisional application 62/080,307, titled "Systems and Methods for Creating Combined Virtual and Physical Environments," filed Nov. 15, 2014, the disclosures of which are incorporated herein by reference.

BACKGROUND

Amusement parks have traditionally included attractions that receive and shuttle several visitors around at a time. Typically, a visitor sits in a vehicle that controls the progress and pace of each and every visitor throughout the attraction. This automated vehicle mechanism works well to get as many users through an attraction as possible, because the vehicle is mechanically attached to a track which transports the visitor through the attraction at a predetermined rate. Though this works well for traditional attractions, it does not translate well to attractions where visitors walk through the attraction on their own. What is needed is an improved system for controlling the flow of users through an attraction where visitors traverse an attraction by foot.

SUMMARY

The present technology, roughly described, controls the flow of teams of one or more players through different geographical areas of a mixed virtual reality and physical experience that takes place on a attraction stage. The geographical areas may include rooms, compartments, or other geographical areas through which a team may progress. Within each geographical area, a team may engage in an experience and accomplish one or more checkpoints. Based on the time to achieve each checkpoint, the experience may be shortened or lengthened, either within the particular geographical area or the experience as a whole, to control the flow of the particular team through the series of geographical areas.

As a team progresses from one geographical area to another, additional teams may follow the first team through the geographical areas. If a team in a subsequent geographical area is taking longer than expected, the subsequent geographical area may be logically "locked" until the team currently in that area progresses to the next geographical area. While a subsequent geographical area is locked, the experience for a team waiting to enter the locked area may be extended until the subsequent geographical area becomes available or logically "unlocked."

An embodiment of the present technology may manage flow of players through a combined physical and virtual reality experience. A computing device may detect the presence of one or more players from a first team of players within a first geographical area of a plurality of geographical areas. An area manager on a server that communicates with the computing device may virtually lock the first geographical area from being accessed by one or more players from a team other than the first team. A virtual reality experience may be initiated by a computing device associated with each player for the first team. The experience may be initiated for each the one or more players from the first team within the first geographical area. A flow manager on the server may automatically adjust the duration of the virtual reality experience for the first team within the first geographical area. The virtual reality experience may be adjusted based on the time taken by the first team to complete one or more checkpoints associated with the first geographical area.

An embodiment of the present technology may be implemented on a non-transitory computer readable medium and may be executable by a processor to perform a method for managing flow of players through a combined physical and virtual reality experience as described herein.

An embodiment of the present technology may be implemented as a system that includes a processor, memory, and one or more modules stored in memory and executable by the processor to perform operations such as the method described above.

DETAILED DESCRIPTION

The present technology, roughly described, controls the flow of teams of one or more players through different geographical areas of a mixed virtual reality and physical experience that takes place on an attraction stage. The geographical areas may include rooms, compartments, or other geographical areas through which a team may progress. Within each geographical area, a team may engage in an experience and accomplish one or more checkpoints. Based on the time to achieve each checkpoint, the experience may be shortened or lengthened, either within the particular geographical area or the experience as a whole, to control the flow of the particular team through the series of geographical areas.

As a team progresses from one geographical area to another, additional teams may follow the first team through the geographical areas. If a team in a subsequent geographical area is taking longer than expected, the subsequent geographical area may be logically "locked" until the team currently in that area progresses to the next geographical area. While a subsequent geographical area is locked, the experience for a team waiting to enter the locked area may be extended until the subsequent geographical area becomes available or logically "unlocked."

Figure 1A:
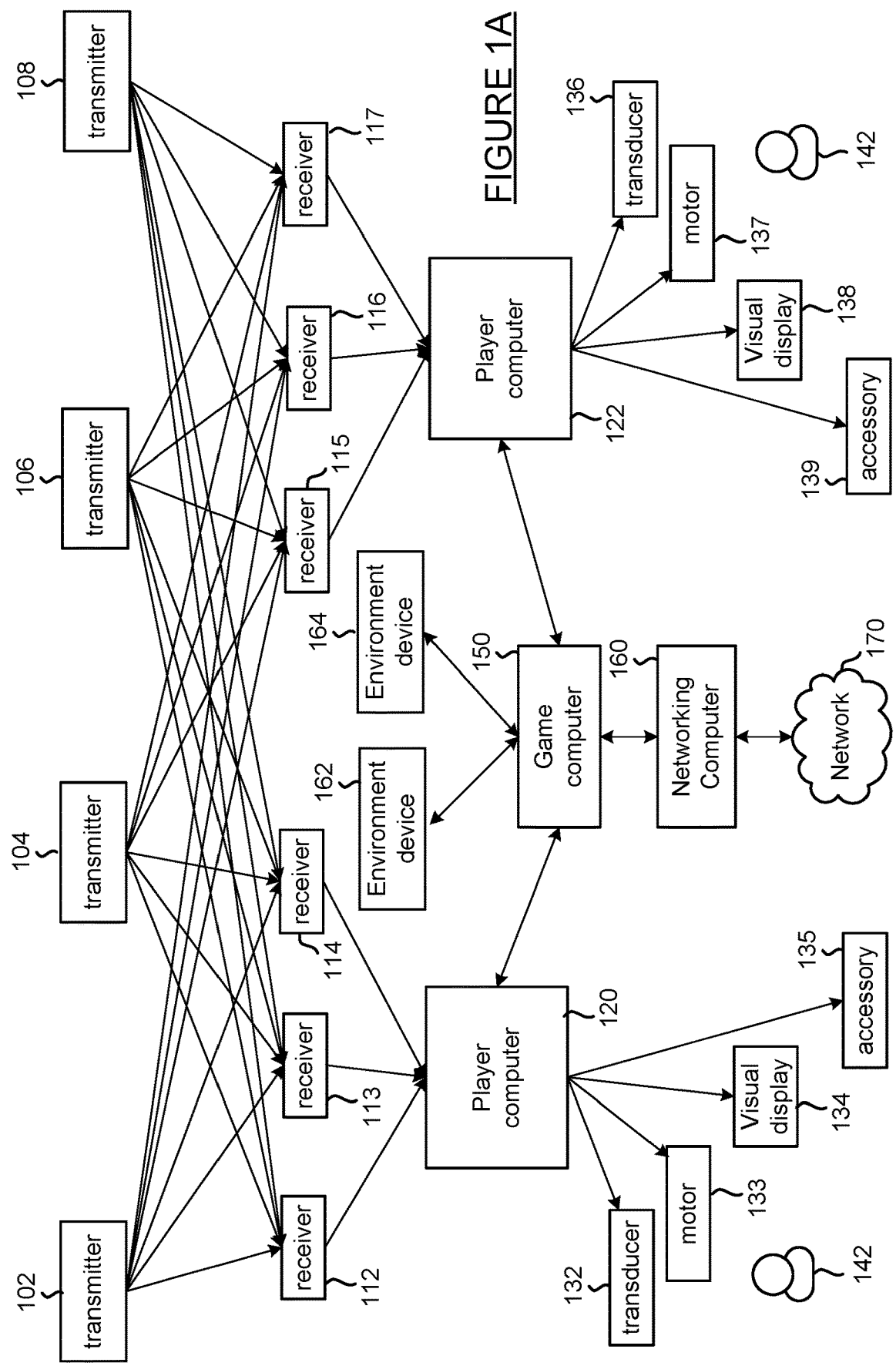
FIG. 1A illustrates a block diagram of an exemplary system for providing a virtual reality experience.

FIG. 1A illustrates a block diagram of an exemplary system for providing a virtual reality experience. The system of FIG. 1 includes transmitters 102, 104, 106, and 108, receivers 112, 113, 114, 115, 116 and 117, player computers 120 and 122, transducers 132 and 136, motors 133 and 137, virtual display 134 and 138, accessories 135 and 139, players 140 and 142, game computer 150, environment devices 162 and 164, networking computer 170, and network 180.

Receivers 112-117 may be placed on a player 140 or an accessory 135. Each receiver may receive one or more signals from one or more of transmitters 102-108. The signals received from each transmitter may include an identifier to identify the particular transmitter. In some instances, each transmitter may transmit an omnidirectional signal periodically at the same point in time. Each receiver may receive signals from multiple transmitters, and each receiver may then provide signal identification information and timestamp information for each received signal to player computer 120. By determining when each transmitter signal is received from a receiver, player computer 120 may identify the location of each receiver.

Player computer 120 may be positioned on a player, such as for example on the back of a vest worn by a player. A player computer may receive information from a plurality of receivers, determine the location of each receiver, and then locally update a virtual environment accordingly. Updates to the virtual environment may include a player's point of view in the environment, events that occur in the environment, and video and audio output to provide to a player representing the player's point of view in the environment along with the events that occur in the environment.

Player computer 120 may also communicate changes to the virtual environment determined locally at the computer to other player computers, such as player computer 122, through game computer 150. In particular, a player computer for a first player may detect a change in the player's position based on receivers on the player's body, determine changes to the virtual environment for that player, provide those changes to game computer 150, and game computer 150 will provide those updates to any other player computers for other players in the same virtual reality session, such as a player associated player computer 122.

A player 140 may have multiple receivers on his or her body. The receivers receive information from the transmitters 102-108 and provide that information to the player computer. In some instances, each receiver may provide the data to the player computer wirelessly, such as for example through a radiofrequency signal such as a Bluetooth signal. In some instances, each receive may be paired or otherwise configured to only communicate data with a particular players computer. In some instances, a particular player computer may be configured to only receive data from a particular set of receivers. Based on physical environment events such as a player walking, local virtual events that are provided by the players computer, or remote virtual events triggered by an element of the virtual environment located remotely from the player, haptic feedback may be triggered and sensed by a player. The haptic feedback may be provided in the terms of transducer 132 and motor 133. For example, if an animal or object touches a player at a particular location on the player's body within the virtual environment, a transducer located at that position may be activated to provide a haptic sensation of being touched by that object.

Visual display 134 may be provided through a headset worn by player 140. The virtual display 134 may include a helmet, virtual display, and other elements and components needed to provide a visual and audio output to player 140. In some instances, player computer 120 may generate and provide virtual environment graphics to a player through the virtual display 140.

Accessory 135 may be an element separate from the player, in communication with player computer 120, and displayed within the virtual environment through visual display 134. For example, an accessory may include a gun, a torch, a light saber, a wand, or any other object that can be graphically displayed within the virtual environment and physically engaged or interacted with by player 140. Accessories 135 may be held by a player 140, touched by a player 140, or otherwise engaged in a physical environment and represented within the virtual environment by player computer 120 through visual display 134.

Game computer 150 may communicate with player computers 120 and 122 to receive updated virtual information from the player computers and provide that information to other player computers currently active in the virtual reality session. Game computer 150 may also manage the flow of one or more teams through the stage of an attraction (i.e., "attraction stage"). Game computer 150 may store and execute a virtual reality engine, such as Unity game engine, Leap Motion, Unreal game engine, or another virtual reality engine. Game computer 150 may also provide virtual environment data to networking computer 170 and ultimately to other remote locations through network 180.

Environment devices 162 may include physical devices that form part of the physical environment. The devices 162 may provide an output that may be sensed or detected by a player 140. For example, an environment device 162 may be a source of heat, cold, wind, sound, smell, vibration, or some other sense that may be detected by a player 140.

Figure 1B:
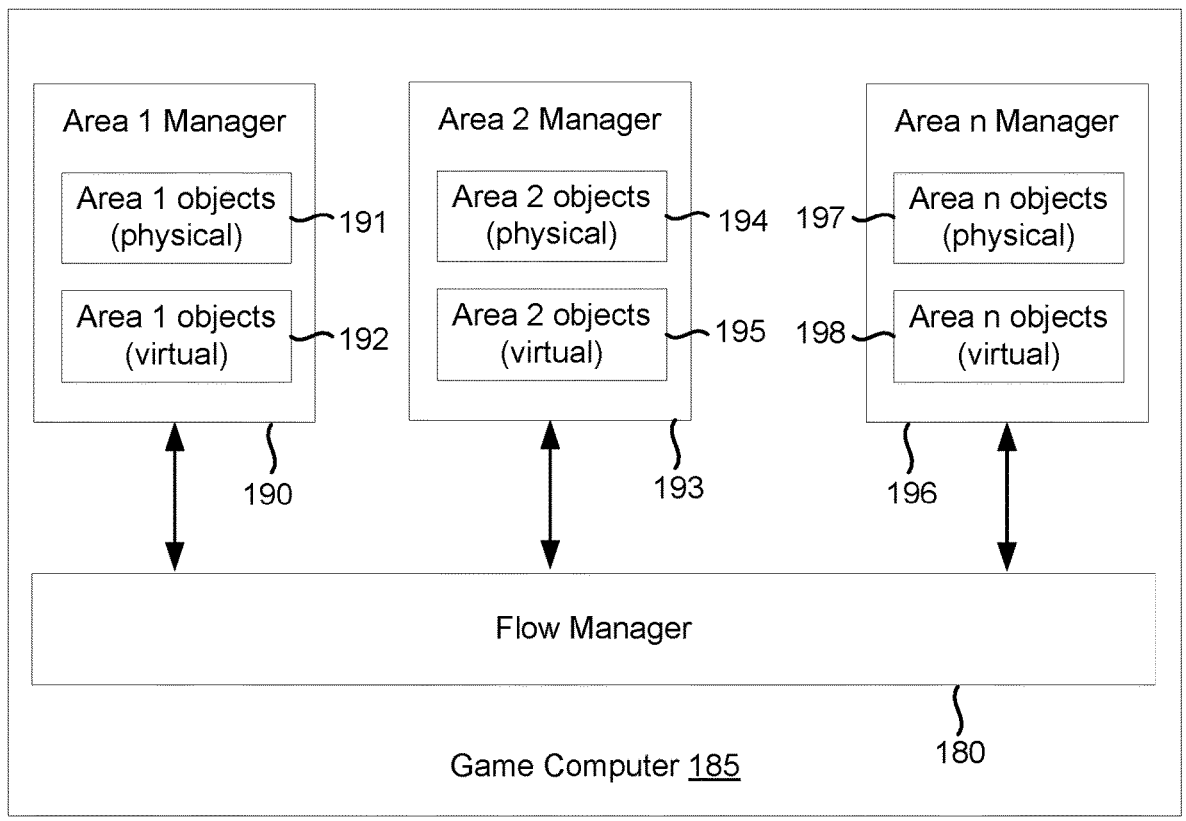
FIG. 1B illustrates a block diagram of an exemplary game computer with area manager modules and a flow manager module.

FIG. 1B illustrates a block diagram of an exemplary game computer with area manager and flow manager modules. The game computer of FIG. 1B may implement at least a portion logical modules of game computer 150 and may include flow manager 180, area one manager 190, area two manager 193, and area three manager 196. Though three area managers are illustrated in FIG. 1B, any number of area managers may be implemented. For example, one area manager may be implemented, within a game computer, for each geographical area within an attraction stage.

Flow manager 180 may communicate with each of area managers 190-196, which are each in turn associated with a geographical area within an attraction stage. For example, in FIG. 2A, there are four geographical areas 220, 230, 240 and 250, which correspond to four area managers. The flow manager may receive an indication from an area manager when the last team member of a particular team enters a geographical area associated with the area manager as well as when the last team member associated with the team exits the corresponding geographical area. In some instances, this may correspond to the virtual locking and unlocking of a geographical area.

Flow manager 180 may adjust the duration of a virtual reality experience within a particular geographical area for a particular team. For example, when a first team enters a first geographical area, the area manager for that area will send an indication to flow manager 180 of that particular time, for example via a time stamp. Additionally, the area manager can provide the status of one or more physical objects 191 or virtual objects 192 within that area to flow manager 180, indications that virtual or physical objects have been engaged within the particular area, and information regarding checkpoints, including the completion of checkpoints, within the area to flow manager 180. Based on the time a team first entered area one, the time associated with an object status, and checkpoint information, flow manager 180 may determine whether a team is within an accepted window, taking too long, or moving faster than expected through a series of checkpoints associated with a geographical location associated with a geographical area. If a team within a particular area is taking longer than expected to complete a series of checkpoints, flow manager 180 may shorten the remaining virtual reality experience within that area to expedite the exit of the particular team from that area, and thereby attempt to stay within a desired time for each geographical area and the overall virtual reality experience. If flow manager 180 determines, based at least in part on the time the team entered an area, object status times, and checkpoint completion times, that a team is progressing through checkpoints faster than the expected time for the particular geographical area, the manager 180 may extend the virtual reality experience by a period of time, thereby attempting to keep the team on track for the desired time for the particular geographical location and the virtual reality experience as a whole.

Each area manager may monitor and reset physical objects and virtual objects within its corresponding area. Physical objects may include heating elements, cooling elements, mist, or water elements, vibrating elements, or other elements that provide a physical sensation (sound, touch, smell, taste, sight) to a user. Virtual objects may include elements within the virtual reality realm of the virtual reality experience, such as locations of virtual objects, positions or appearances of virtual elements, and other virtual objects.

Each area manager may virtually lock and unlock the geographical area it is configured to control. When a team enters a new geographical area within an attraction stage, once the last team member is inside that geographical area, the area manager for that area will virtually lock the area so that no other teams or users may enter the area. When a team completely exits a geographical area, either to the next geographical area or to a staging area, the area manager controlling that geographical area can unlock the area and reset the physical objects 191 and virtual objects 192 so that the area is ready to receive the next team.

FIGS. 2A-2H illustrate an exemplary attraction stage having multiple geographical areas subject to team flow control mechanisms. The attraction stage of FIGS. 2A-2H includes a staging area 210 and four geographical areas 220, 230, 240, and 250. Each geographical area may include physical objects that may be engaged or experienced by one or more users of a team in that geographical area during the virtual reality experience within that geographical area. For example, area 220 includes physical object 222 which may include a heating element, area 230 includes physical object 232 which may include a vibrating floor, area 240 includes physical object 242 which may include a mechanism for providing a particular odor, and area 250 includes physical object 252 which may provide a fan to blow air in a particular direction.

Each geographical area may also include virtual objects that may be experienced virtually within the virtual reality experience provided within the geographical area. Examples of virtual objects include but are not limited to virtual switches or control panel, virtual beings or creatures, virtual flames, ice, elevators, windy corridors, or other elements that may be provided in conjunction with physical objects, or any other object within the virtual reality portion of the experience that performs a virtual action, such as a sound or change in appearance, based on an event that occurs within the virtual reality experience.

Figure 2A:
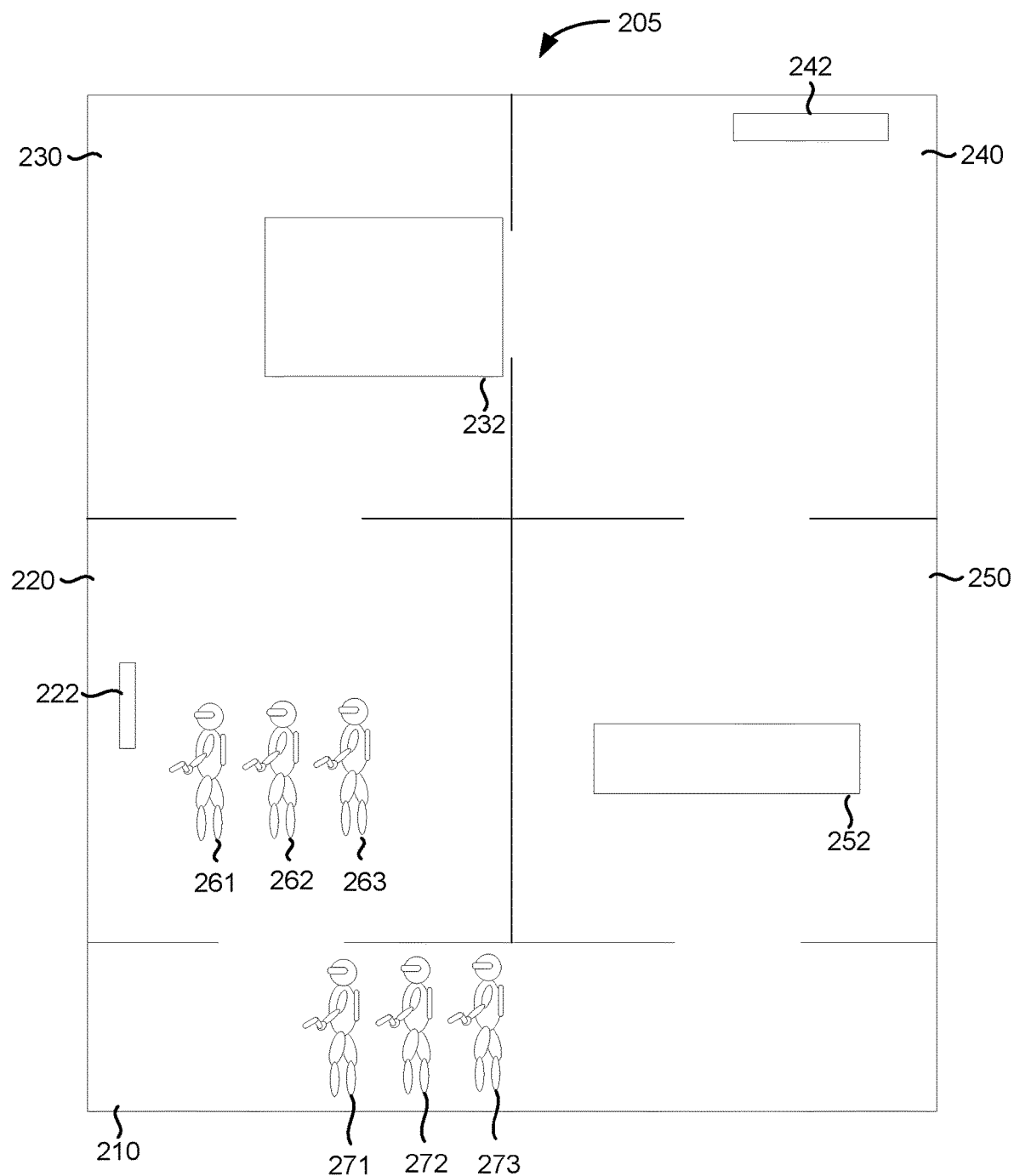
FIGS. 2A-2H illustrate an exemplary attraction stage having multiple geographical areas.

The attraction stage of FIG. 2A illustrates two teams, a first team of players 261, 262 and 263, and a second team of players 271, 272, and 273. In some instances, all teams begin the experience by "suiting up" in staging/exit area 210. Suiting up may include loading a harness that includes a player computer, configuring each player as a member of a particular team, and allowing the team to move forward within the attraction stage to the first geographical area. The combined physical and virtual reality experience may begin in the staging area once all team players are suited up, and continue as the team progresses through the geographical areas.

In FIG. 2A, the first team has exited staging area 210 and entered the first geographical area 220. The second team is in the staging area 210 waiting to enter the first geographical area 220. When the first team entered area 220, the area manager associated with area 220 virtually locked area 220, thereby preventing any other teams from entering the area. In some instances, a virtual portal that leads to area 220 may not appear to members of the second team until area 220 has been unlocked by its corresponding area manager.

Figure 2B:
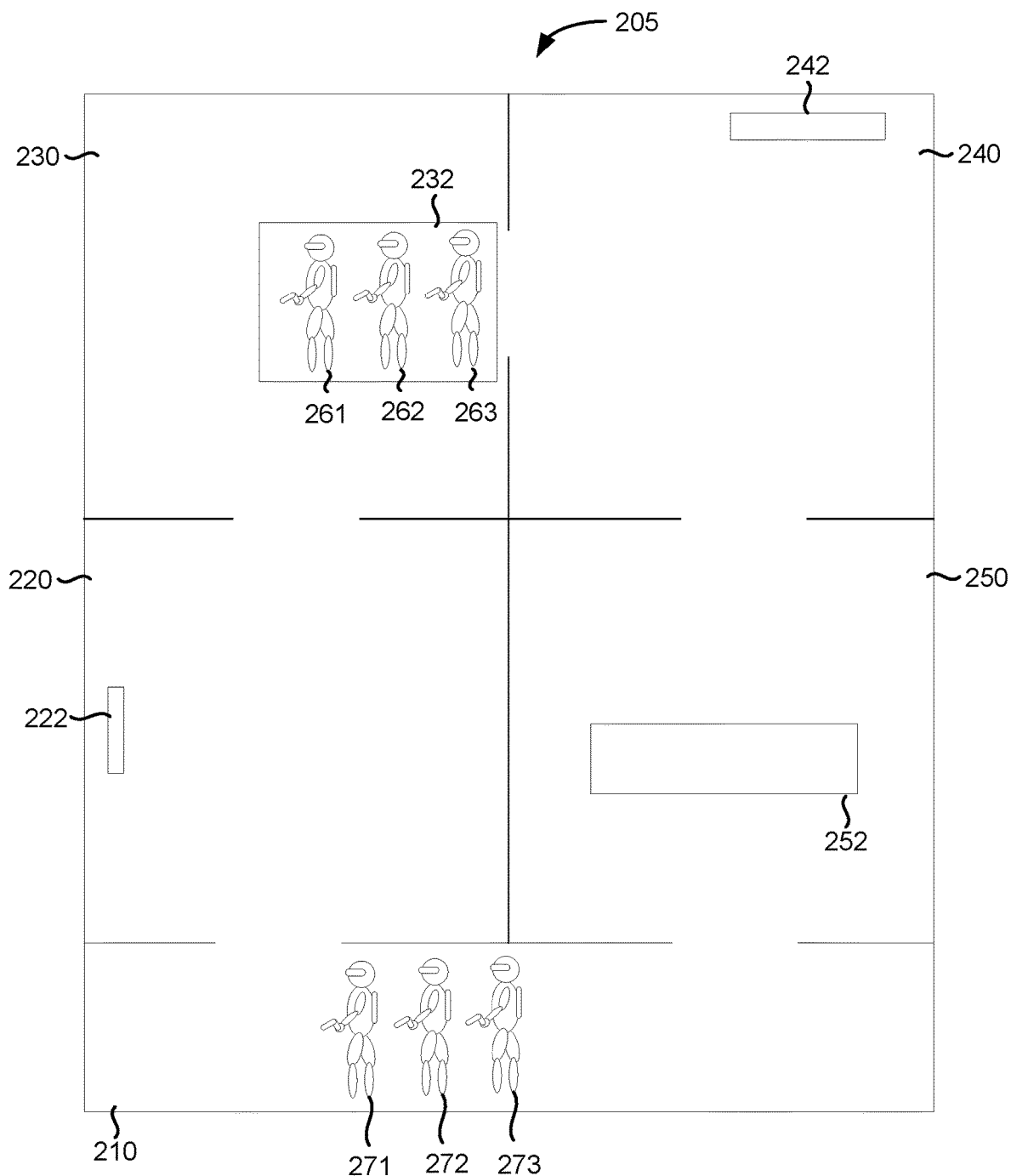
Figure 2C:
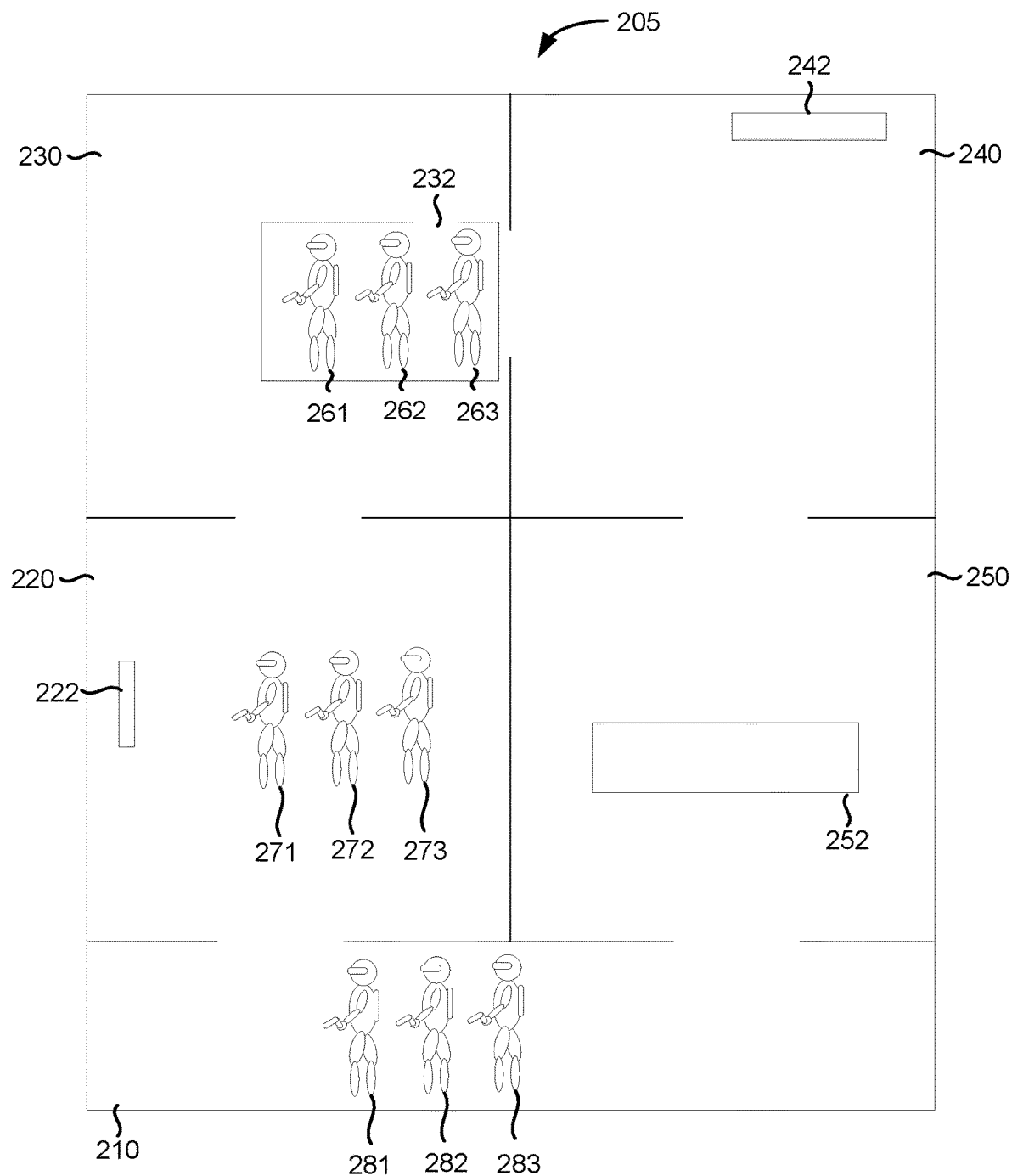

Once the first team exits area 220 and enters area 230 as shown in FIG. 2B, the area manager for area 220 will reset the physical objects and virtual objects of area 220 and unlock area 220. By unlocking area 220, the second team may enter area 220 from staging area 210. The area manager associated with area 230 will lock area 230 once the first team enters area 230. The second team enters unlocked area 220 as illustrated in FIG. 2C. A third team of players 281, 282, and 283 may be prepared in staging area 210, waiting for area 220 to be virtually unlocked by its area manager.

Figure 2D:
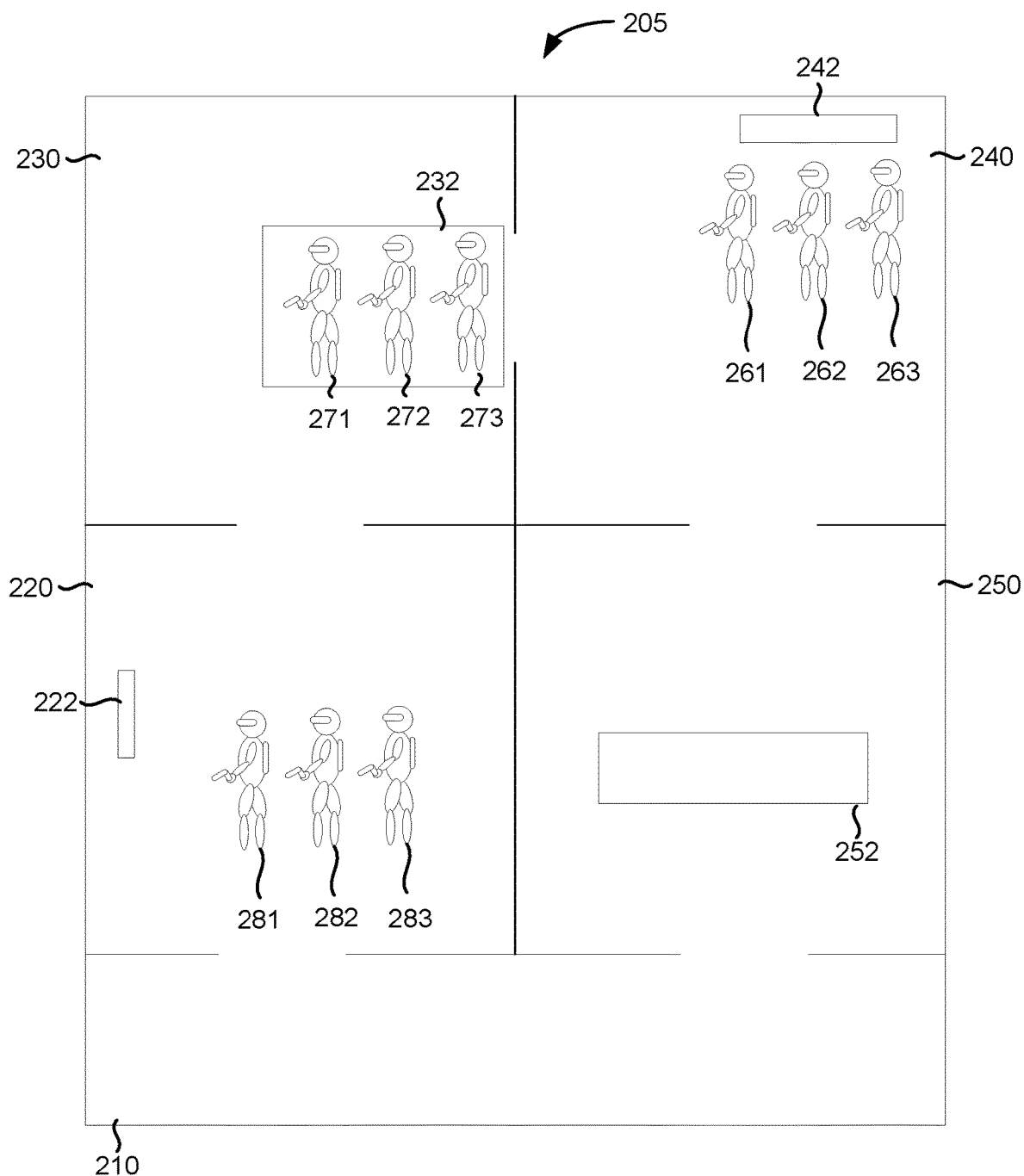
Figure 2E:
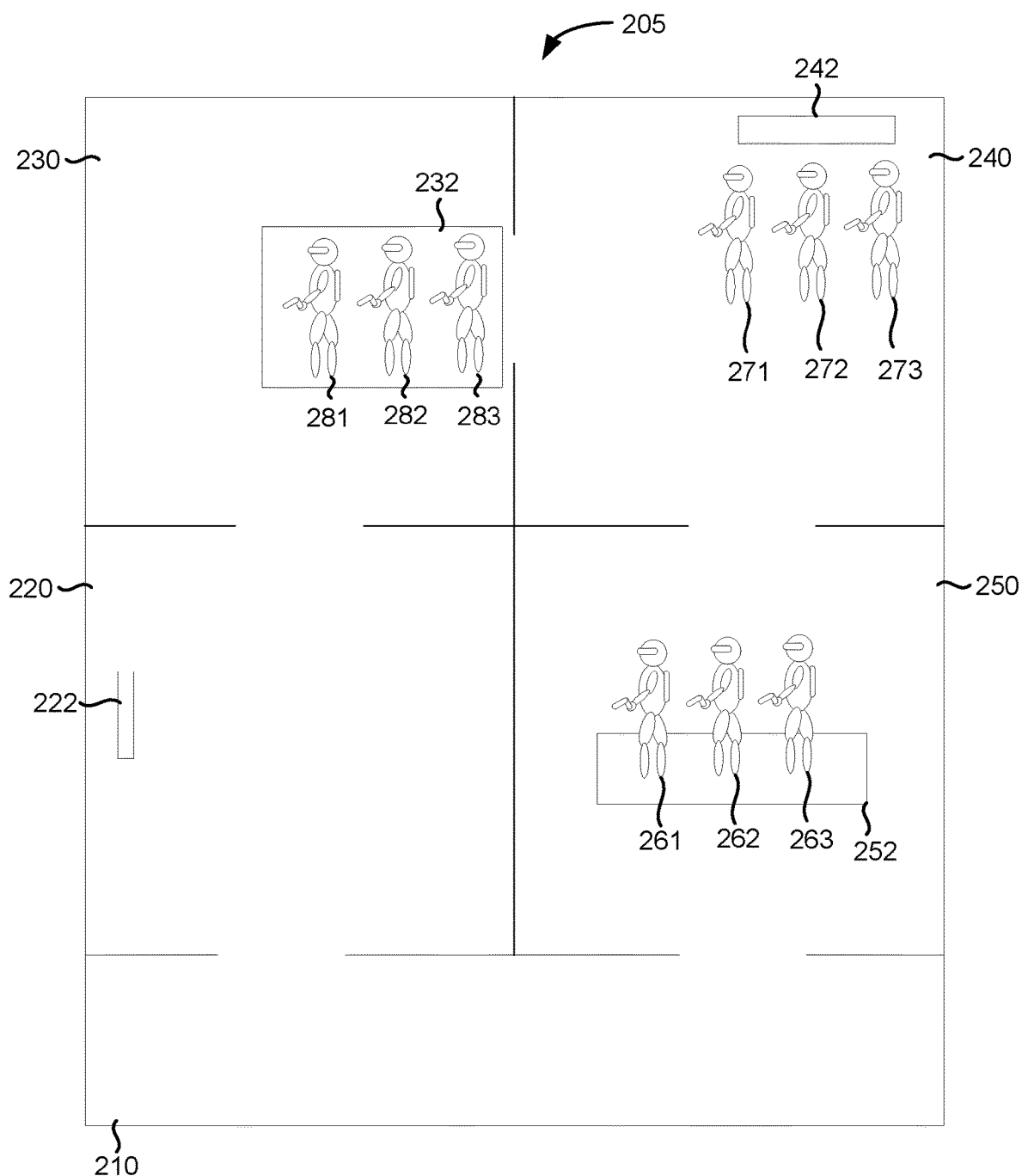

Once the first team has completed the checkpoints associated with the area of 230, the first team may proceed to area 240. After exiting area 230, the virtual and physical objects of area 230 will be reset and the area will be virtually unlocked by the corresponding area manager. Similarly, once the first team enters area 240, area 240 will be virtually locked by a corresponding area manager. The flow of teams through the geographical areas continues in this manner, such that when a team has completed the checkpoints within its current geographical area, and the next area is virtually unlocked, the team may proceed into that area. For example, the second team may proceed from area 220 to area 230, and the third team may move from the staging area 210 to the first area 220 as shown in FIG. 2D.

In some instances, to help the flow of teams through the attraction stage between one geographical area to the next, the intended duration for each virtual experience may be cascaded such that subsequent areas have a shorter virtual-reality duration than previous experiences. With respect to FIG. 2E, the virtual reality experience of area 220 may be designed to last six minutes, the virtual reality experience of area 230 may be designed to last approximately five minutes, the virtual reality experience of area 240 may be designed to last four minutes, the virtual reality experience of area 250 may be designed to last three minutes. By cascading the time associated with each virtual reality experience within the areas of an attraction stage, the flow of teams through the attraction stage may take place with lower chance of a team in a subsequent geographical area holding up a team in an immediately prior geographical area. In particular, a team in a subsequent area may exit that area, resulting in the area being available for the next team, before the next team is typically ready to enter that area.

Figure 2F:
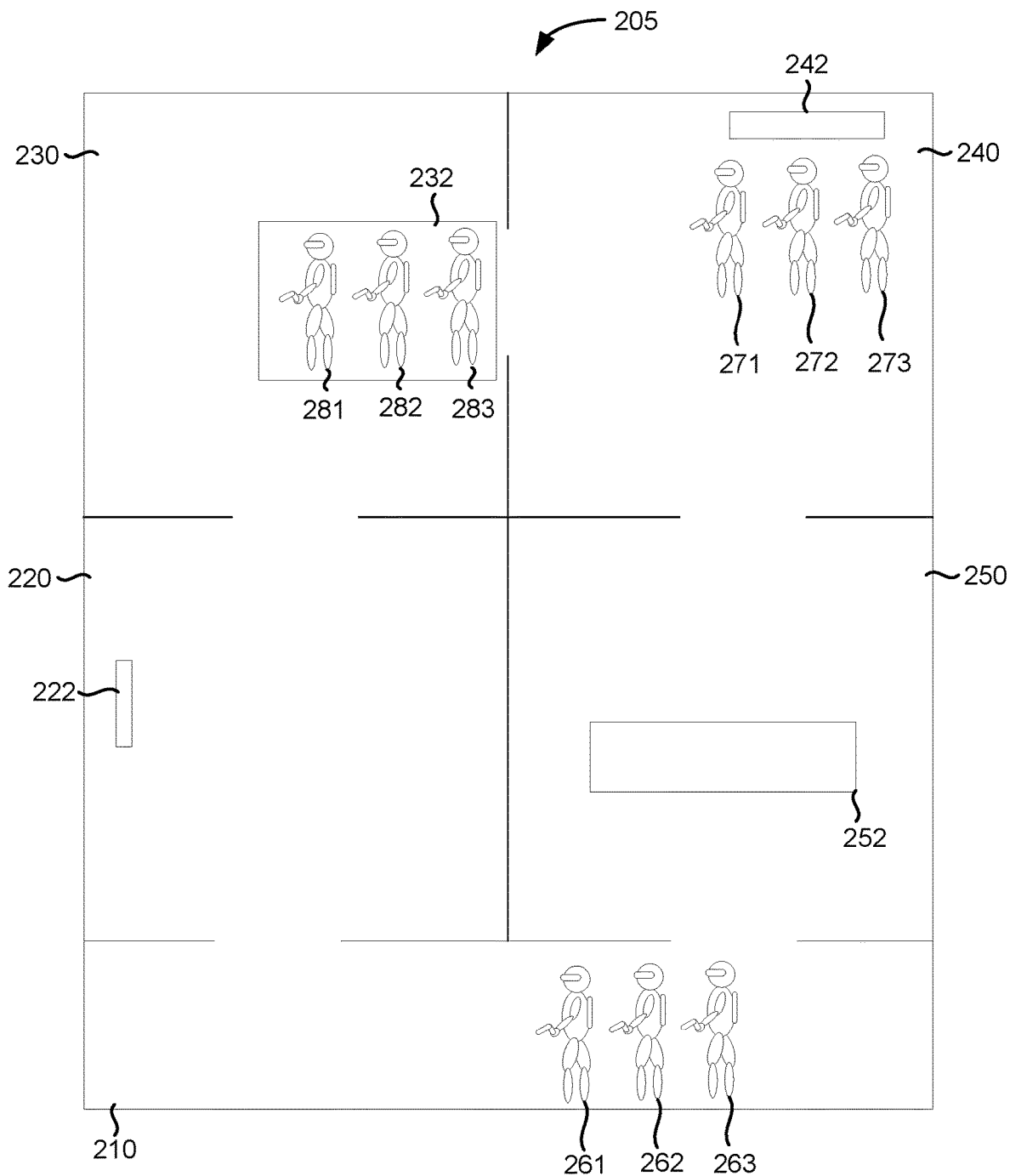

In some instances, despite a cascading duration for each virtual reality area within an attraction stage, some teams may take longer than expected to complete a series of checkpoints within a particular area. As shown in FIG. 2F, even though an area 250 may be virtually unlocked because the first team (players 261-263) has exited the area, the second team within area 240 may take longer than expected and thereby hold up the progress of the third team from exiting area 230 and entering area 240. In this case, the virtual reality experience of the team in area 230 may be extended.

The duration of a team's virtual reality experience may be adjusted based on progress, such as for example the timing of completion of checkpoints, within a geographical area or a team's overall time in the virtual experience across two or more geographical areas. In some instances, an overall virtual reality experience may be the culmination of individual virtual reality experiences provided within each geographical area of an attraction stage. For example, if the duration of a team's progression through the first two geological areas is greater than the target window for the first two geographical areas, then the virtual reality experience for the third geographical area can be shortened.

A virtual reality experience may be extended in one or more of several ways, including but not limited to adding additional content, adjusting puzzles or tasks to require more elements to complete, requiring the tasks be performed an additional number of times before a checkpoint is accomplished, and other means. Concurrently, if the second team is taking longer than expected in area 240, their virtual experience may be shortened to expedite their completion of checkpoints within that area. A virtual experience may be shortened by making puzzles easier to solve, removing content to be provided during the virtual experience, eliminating puzzles or tasks to be completed, and other means.

Figure 2G:
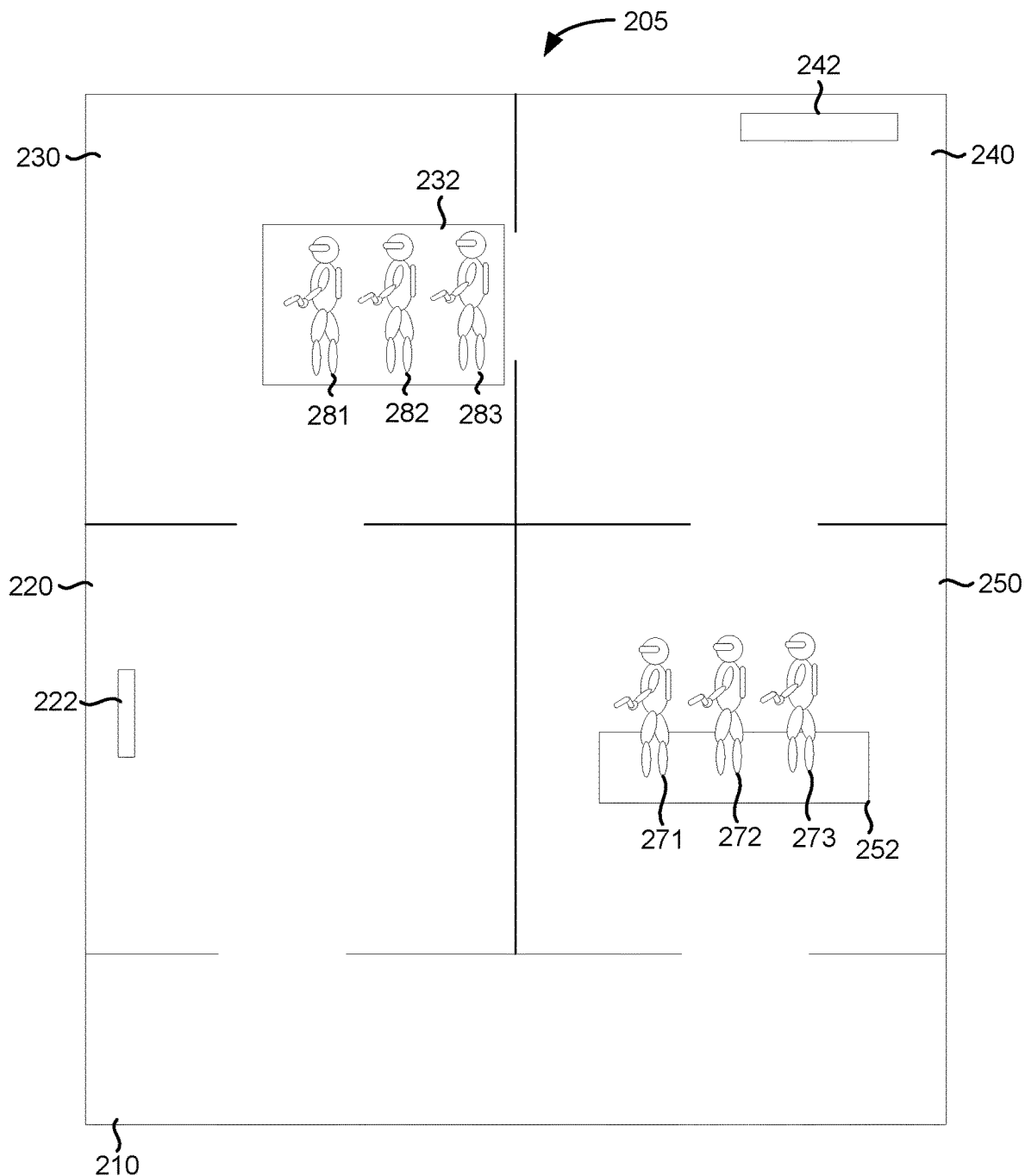
Figure 2H:
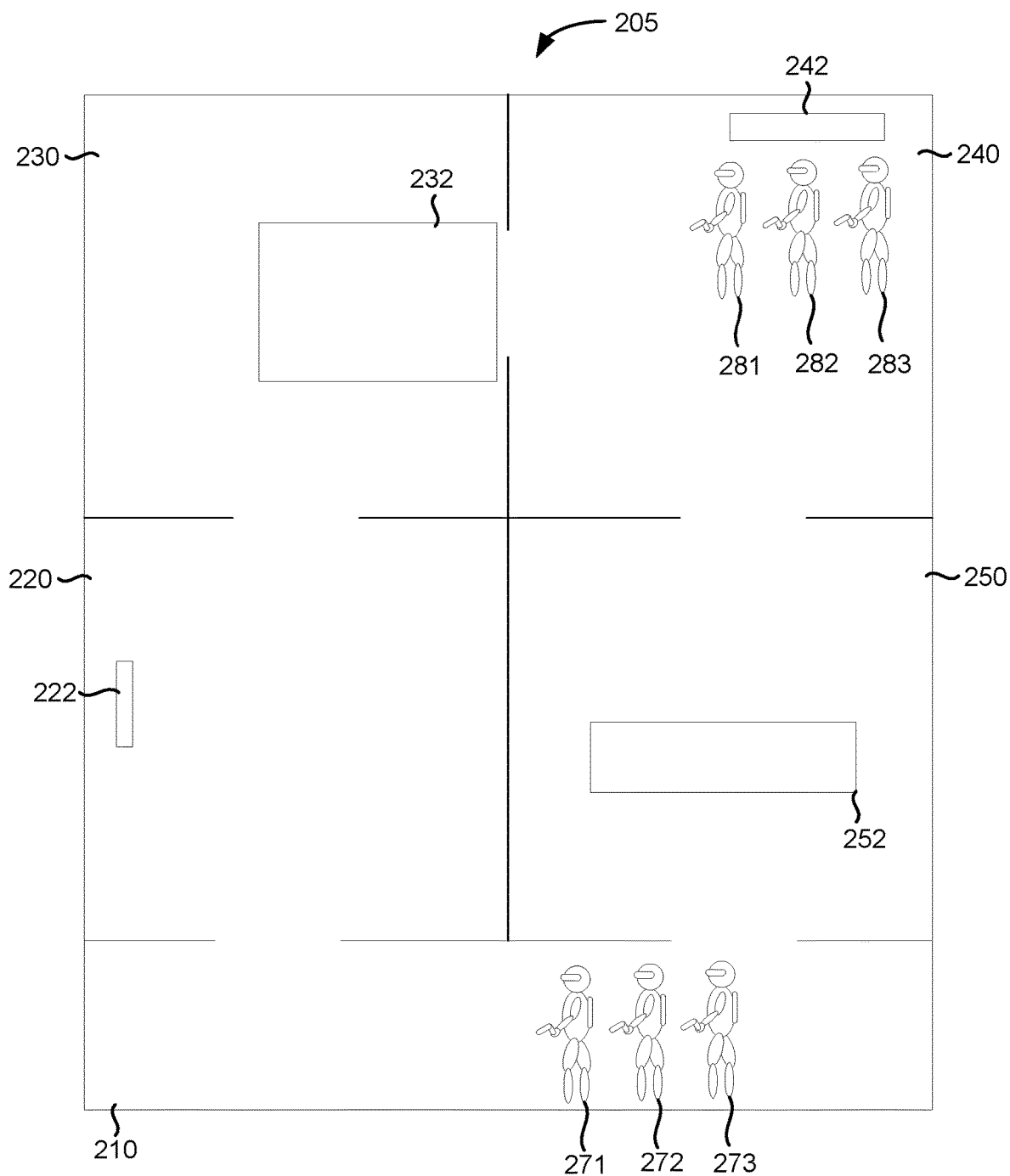

Once the second team has completed the checkpoints for an area 240, they may progress to area 250 as shown in FIG. 2G. Eventually, the second team may continue to the exit stage as shown in FIG. 2H and the third team may continue to progress through the attraction stage until they arrive at the exit stage 210 as well.

Figure 3A:
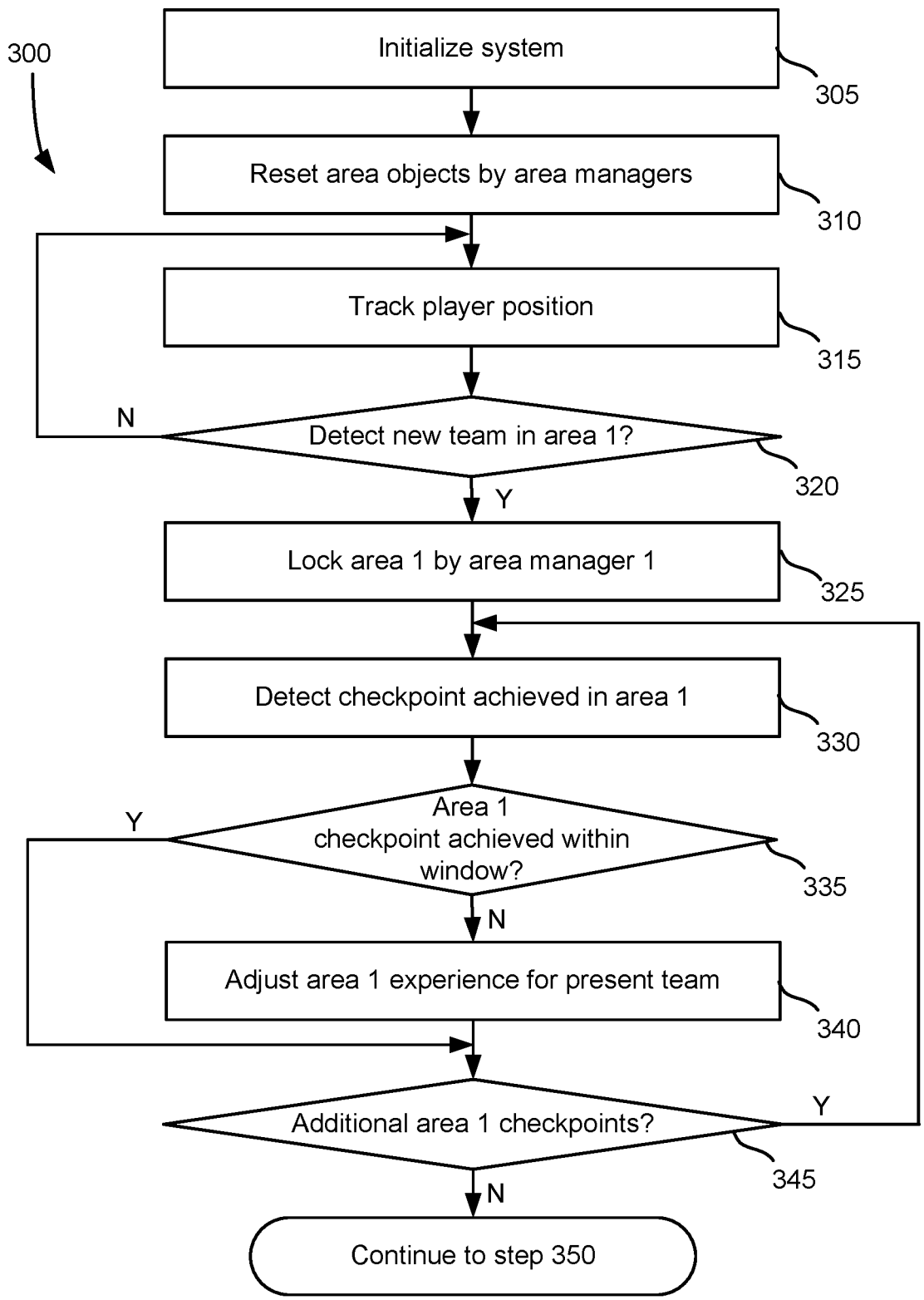
FIGS. 3A-3B illustrates an exemplary method for performing team flow control through a combined physical and virtual reality experience.
Figure 3B:
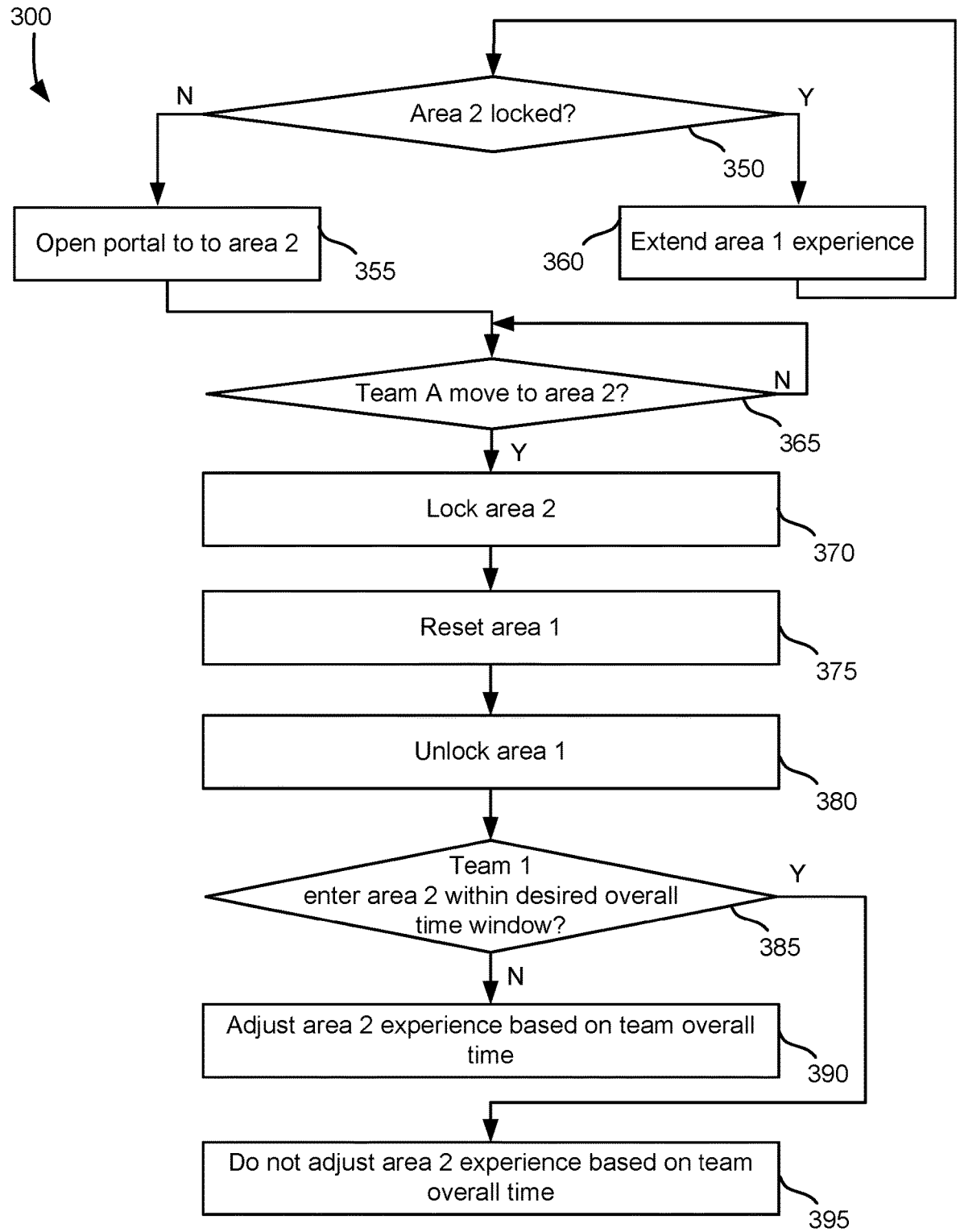

FIGS. 3A-3B illustrate an exemplary method for performing team flow control through a virtual reality experience. First, a virtual reality system may be initialized at step 305. Initializing the system may include starting up a server and player computer systems, configuring teams and area managers, and other activities. Initializing a virtual reality system is discussed in more detail below with respect to the method of FIG. 4.

Area objects may be reset by area managers at step 310. In some instances, after the initialization of the system, each geographical area is reset by an area manager to make the area ready to receive a team of players. The reset for a particular geographical area may be performed by an area manager associated with that particular area. The reset may include resetting the state of physical objects and virtual objects within or associated with that particular area. For example, assuming area 220 in FIG. 2 is associated with area manager 190, physical objects 191 (which may include physical object 222) and virtual objects 192 may be reset for geographical area 220.

After initialization and resetting the area objects, a first team may be prepped in staging area 210 and allowed to proceed through the attraction stage. As each player in the team navigates through the stage, player positions are tracked at step 315. Each player may include one or more receivers attached or coupled to various locations on the players body. Each receive can receive signals from transmitters positioned throughout the attraction stage. A location can be determined for each receiver displaced on a user, and thereby the user's overall position, based on processing and triangulating the signals received by each receiver from the plurality of transmitters.

Though an attraction stage may include a plurality of areas, such as four areas and a staging area in the attraction stage illustrated in FIGS. 2A-2H, only two stages will be discussed in the method of FIGS. 3A-3B. This is for exemplary purposes only, and is not meant to be limit the scope of the present technology. Rather, one or more steps of method 300 illustrated in FIGS. 3A-3B can be repeated multiple times depending on the number of areas present within an attraction stage.

A determination is made as to whether a new team is detected to be positioned in a first geographical area at step 320. In some instances, a team is detected to be in a first area if one or more of the team members are detected to be in the geographical area. If no team is detected in the first stage, player positions continue to be tracked at step 315 until a new team is detected in the first area. Once a team is detected to be within the first area, the first area is locked by an area manager associated with that area at step 325. The locking of the first area is a "virtual" lock of the area, intended to prevent other teams from entering the area while a team is still in that area.

A checkpoint achieved by the first team in the first area is detected at step 330. Once the checkpoint is achieved, a determination is made as to whether the checkpoint within the first area was achieved within a desired window at step 335. In some instances, a virtual reality experience within a particular geographical area of an attraction stage may be designed to be completed within a specific period of time. That period of time may be subdivided into shorter periods of time during which a number of checkpoints are each designed to be accomplished. If a team is not on track to complete the checkpoints within the desired period of time for that particular geographical area, as evidenced by a first checkpoint not being achieved during the desired window at step 335, the virtual experience within that first area may be adjusted for the present team at step 340. The virtual experience for the first team within the first area may be adjusted to extend or shorten the virtual experience based on the progress by that team in accomplishing the checkpoint. Adjusting an experience for a team within a particular geographical area is discussed in more detail below with respect to the method of FIG. 5. After the virtual experience has been adjusted, the method continues to step 345. If the checkpoint was achieved within the window, the method continues to step 345 without adjusting the virtual experience.

A determination is made at step 345 as to whether there are additional checkpoints to complete in the current area for the current team. If there are no additional checkpoints, the method continues to step 350. If there are additional checkpoints, the method returns to step 330 wherein completion of the checkpoint is detected. In some instances, if a team is taking longer than expected to complete one or more checkpoints within a particular area, adjusting the experience for the present team may include removing one or more checkpoints to be completed. In this case, the determination at step 345 as to whether there are any additional checkpoints to be completed may result in a determination that normally there may be additional checkpoints but, based on the team's progress, the additional checkpoints have been removed and the method continues to step 350.

Once there are no more checkpoints to be achieved by a team in a particular geographical area, a determination is made as to whether the next area within the attraction stage is locked at step 350. In some instances, an area manager associated with a particular geographical area may virtually lock that area when a team is still in that area. Once the team leaves the area, the area manager will virtually unlock the area after resetting all the virtual and school objects within that area. If a second area to be experienced by a team is virtually locked at step 350, the virtual experience of a team waiting to enter that area is extended at step 360. Extending a virtual reality experience is discussed in more detail below with respect to the method of FIG. 5.

Once the area to be entered is opened or unlocked, the portal to that subsequent area is opened at step 355. The portal may include a visual and/or audio virtual entryway from the current area to the subsequent area. Once the portal is opened, a determination is made as to whether a team has entered the subsequent area at step 365. Once a team is entered the subsequent area, the subsequent area entered by the team is locked at step 370. The previous area exited by the team is reset by the area manager controlling that area at step 375. The area manager may also unlock the previous area so that subsequent teams can enter that area at step 380.

A determination is made as to whether a team enters a subsequent area within a desired overall time window at step 385. In some instances, there is a desired time window during which each team is expected to progress through each geographical area. If a particular team is not progressing through the virtual reality experience areas within the expected time window, either because they are taking too long or progressing too quickly, their virtual reality experience in a subsequent particular geographical area may be adjusted (before or at the time of entry into the subsequent geographical area) to help get their virtual reality experience duration back within the expected time duration for experiencing the attraction. Adjusting a subsequent experience based on the team overall time is discussed in more detail below with respect to the method of FIG. 5. If a team enters subsequent area within the desired overall time window, no adjustments may be made to the virtual reality experience based on the team overall time at step 395.

Figure 4:
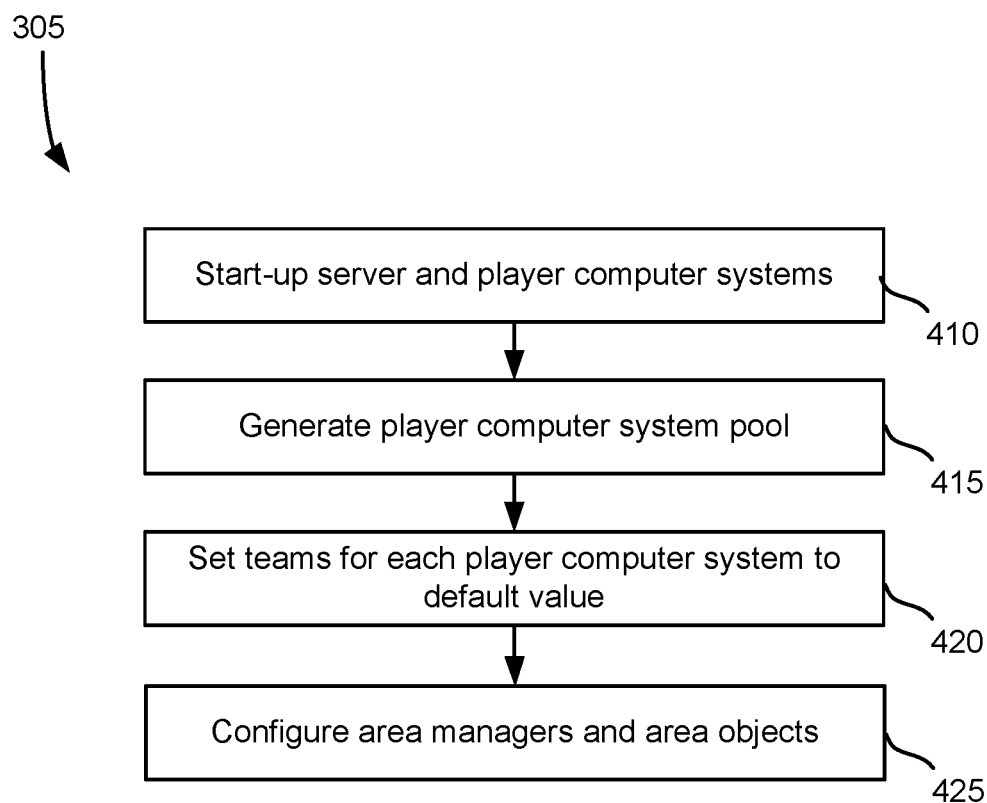
FIG. 4 illustrates an exemplary method for initializing a virtual reality system.

FIG. 4 illustrates an exemplary method for initializing a virtual reality system. The method of FIG. 4 provides more detail for step 305 of the method of FIG. 3. First, a game server and player computer systems are powered on at step 410. A player computer system pool is generated at step 415. The player computer system pool is comprised of each player computer system that is booted-up at step 410 and recognized by gaming computer 150.

A team value for each player computer system is set to a default value at step 420. In some instances, the default value will be zero, and then may increment for each team sent into the attraction stage. Area managers and area objects may be configured at step 425. Configuring the managers and area objects may confirm that the area managers are operating correctly, that they can recognize the physical and virtual objects within their particular geographical area, and that the area managers can reset each physical and virtual object within that area.

In some instances, initialization may include additional steps, such as for example configuring a virtual reality space with the physical space. This may include accessing measurements of the physical space, lining up corners walls in the physical space with points on walls of the virtual space, and assigning physical points along the walls and corners to virtual environment points. In some instances, this may result in restructuring a virtual environment based on the physical space to fit a physical space. In this manner, the virtual environment may be synchronized and lined up with the virtual reality space so that a user gets a more realistic experience within the virtual reality experience.

Figure 5:
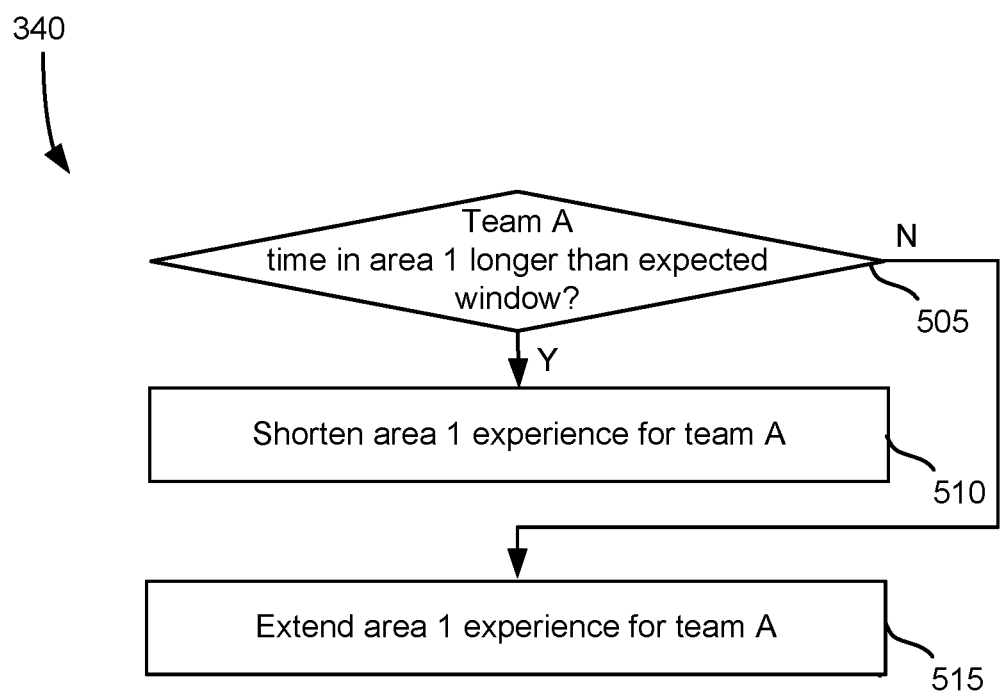
FIG. 5 illustrates an exemplary method for adjusting a virtual reality experience in a geographic location within an attraction stage.

FIG. 5 illustrates an exemplary method for adjusting a virtual reality experience in a geographic location. The method of FIG. 5 provides more detail for step 340 the method of FIG. 4. First, a determination is made as to whether a particular team has been in a particular area longer than the expected time for that particular area, or while attempting to complete a checkpoint, at step 505. In some instances, the determination is made as to whether a team is taking longer than an expected time to achieve a checkpoint. For example, for a geographical area 220 of FIGS. 2A-2H, the expected duration for a particular team to be in that area and achieve all the checkpoints of that area may be six minutes. If a team has been in that area for over six minutes, the remainder of the virtual reality experience associated with area 220 may be shortened at step 510 for the particular team to expedite their exit of that area. Shortening an experience for a team within a particular geographical area may include removing one or more puzzles or checkpoints to accomplish within that area, removing virtual-reality content to be provided to the team within that area, making puzzles or tasks easier to accomplish or less complicated, or other steps to expedite the end of a virtual reality experience within a particular geographical area for that team.

If a team is not taking longer than expected, but actually progressed through one or more checkpoints or an area as a whole in less time than expected, the experience for the particular team may be extended at step 515. Extending an experience for a team within a particular geographical area may include adding one or more puzzles or checkpoints to accomplish within that area, adding virtual-reality content to be provided to the team within that area, making puzzles or tasks more difficult to accomplish or more complicated, or other steps to extend the end of a virtual reality experience within a particular geographical area for that team.

Figure 6:
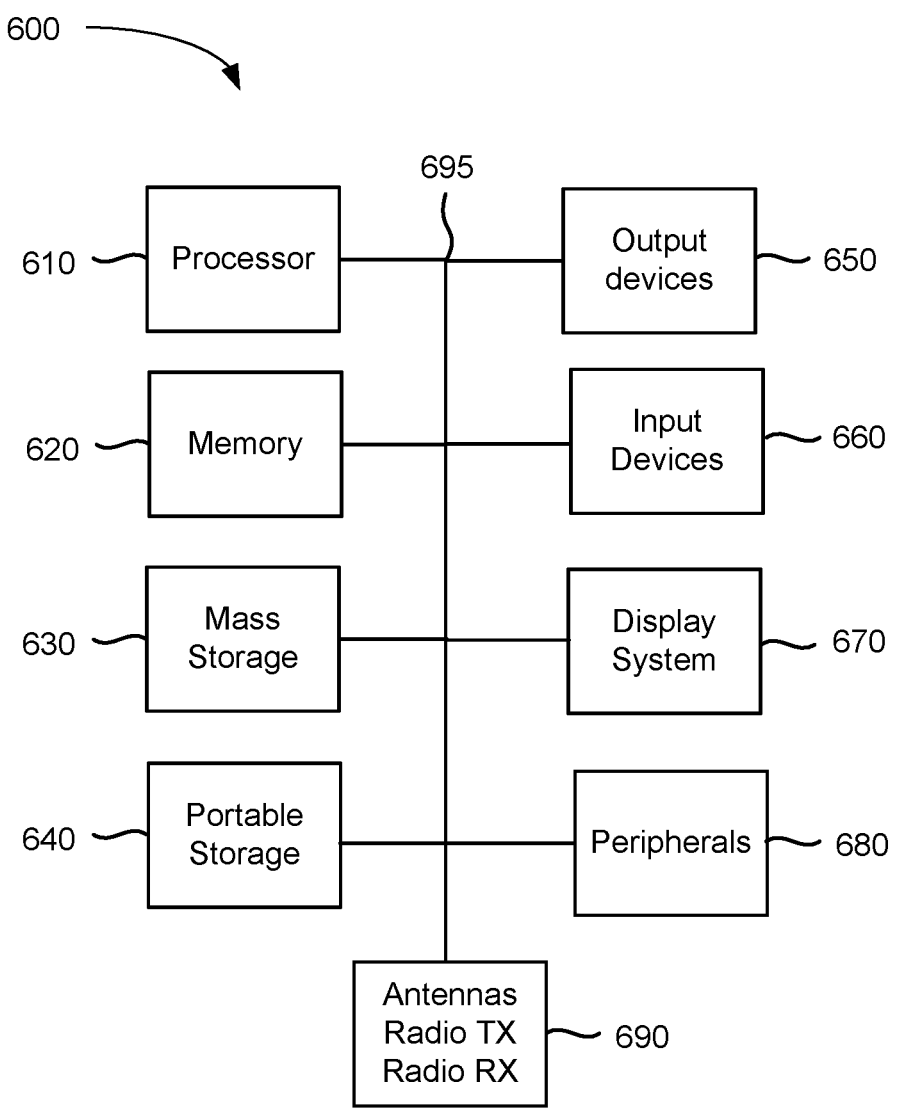
FIG. 6 illustrates a block diagram of an exemplary system for implementing the present technology.

FIG. 6 illustrates an exemplary computing system 600 that may be used to implement a computing device for use with the present technology. System 600 of FIG. 6 may be implemented in the contexts of the likes of player computing devices 120 and 122 and game computer 150. The computing system 600 of FIG. 6 includes one or more processors 610 and memory 610. Main memory 610 stores, in part, instructions and data for execution by processor 610. Main memory 610 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 610 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive, an optical disk drive, or solid state non-volatile storage, is a non-volatile storage device for storing data and instructions for use by processor unit 610. Mass storage device 630 can store the system software for implementing embodiments of the present invention for purposes of loading that software into main memory 610.

Portable storage device 640 operates in conjunction with a portable non-volatile storage medium, such as a floppy disk, compact disk, Digital video disc, flash drive, or other portable memory to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys, a microphone, or a touchscreen display. Additionally, the system 600 as shown in FIG. 6 includes output devices 650. Examples of suitable output devices include speakers, printers, network interfaces, displays, and monitors.

Display system 670 may include a liquid crystal display (LCD), LED display, touch screen display, or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for managing flow of players through a combined physical and virtual reality experience, the method comprising:
receiving position data indicating presence of one or more first players of a first team of players within a first geographical area of a plurality of defined geographical areas;
virtually locking, by an area manager executing on a server, the first geographical area from being accessed by one or more second players of a second team of players in a second geographical area of the plurality of defined geographical areas, wherein the first geographical area is virtually locked until the first team of players completes one or more checkpoints associated with the first geographical area;
causing each of a plurality of respective computing devices associated with the one or more first players of the first team to provide a virtual reality experience the virtual reality experience providing graphics and audio to each of the one or more first players individually to enable the one or more first players of the first team to complete the one or more checkpoints associated with the first geographical area; and
adjusting, by a flow manager executing on the server, a duration of the virtual reality experience for the first team of players within the first geographical area based on a time taken by the first team of players to complete one or more checkpoints associated with the first geographical area.

2. The method of claim 1, wherein the position data is first position data, the method further comprising:
receiving second position data indicating that the first team of players has exited the first geographical area; and
virtually unlocking the first geographical area for the one or more second players of the second team.

3. The method of claim 1, wherein adjusting the duration of the virtual reality experience for the first team of players within the first geographical area includes shortening the duration of the virtual reality experience in response to detecting the first team has taken longer than an expected time to complete a checkpoint associated with the first geographical area.

4. The method of claim 3, further comprising decreasing a duration of a virtual reality experience in a second geographical area for the first team in response to detecting the time spent in the first geographical area by the first team has taken longer than an expected time to be spent within the first geographical area.

5. The method of claim 1, wherein adjusting the duration of the virtual reality experience for the first team of players includes extending the duration of the virtual reality experience in response to detecting the first team of players has taken less than an expected time to complete a checkpoint within the first geographical area.

6. The method of claim 1, wherein each geographical area of the plurality of defined geographical areas adjoin at least one other geographical area of the plurality of defined geographical areas.

7. The method of claim 1, wherein the position data is first position data, the method further comprising:
receiving second position data indicating that the first team of players is present in a third geographical area of the plurality of defined geographical areas;
extending a virtual reality experience of the second team in a first geographical area connected to the second geographical area until the first team has exited the third geographical area;
resetting a plurality of virtual objects and physical objects in the second geographical area; and
allowing the second team to exit the first geographical area and enter the adjoining second geographical area.

8. The method of claim 1, wherein position data for a player of the first team of players is generated at least in part by a computing device worn by the player, the computing device coupled to at least one receiver on the player that receives signals from a plurality of transmitters in plurality of defined geographical areas.

9. The method of claim 1, wherein the position data is used to update virtual experience provided to the one or more first players of the first team.

10. The method of claim 1, further comprising receiving position data from a first player of the first team of players and sending the position data to a second player of the first team of players.

11. The method of claim 1, wherein the virtual experience is provided to the first team of players in part via a plurality of respective headsets worn by the players of the first team of players.

12. The method of claim 1, further comprising causing, by the server, an environment device in the first geographical area to be activated based on the presence of the first team of players in the first geographical area.

13. The method of claim 1, wherein the server executes a separate area manager for each geographical area of the plurality of defined geographical area.

14. The method of claim 1, further comprising storing an entry time at which the first team of players entered the first geographical area, wherein a duration of the first team of players is measured relative to the entry time.

15. The method of claim 1, wherein completion of the one or more checkpoints associated with the first geographical area includes player interaction with one or more virtual objects.

16. The method of claim 1, wherein adjust the duration of the virtual reality experience for the first team of players within the first geographical area is further based the time taken by the first team of players to complete one or more other geographical areas of the plurality of defined geographical areas.

17. The method of claim 1, wherein adjusting the duration of the virtual reality experience includes at least one of: adding additional checkpoints to complete, decreasing a number of checkpoints to complete, increasing a number of times that a checkpoint is to be completed, decreasing a number of times that a checkpoint is to be completed, eliminating a checkpoint, increasing a difficulty of a checkpoint, or decreasing a difficulty of a checkpoint.

18. The method of claim 1, further comprising in response to the first team exiting the first geographical area of the plurality of defined geographical areas, resetting the first geographical area for entry by the second team of players.

19. A non-transitory computer readable storage medium having embodied thereon a program, the program being executable by a processor to perform a method for managing flow of players through a combined physical and virtual reality experience, the method comprising:
receiving position data indicating presence of one or more first players of a first team of players within a first geographical area of a plurality of defined geographical areas;
virtually locking, by an area manager executing on a server the first geographical area from being accessed by one or more second players of a second team of players in a second geographical area of the plurality of defined geographical areas, wherein the first geographical area is virtually locked until the first team of players completes one or more checkpoints associated with the first geographical area;
causing each of a plurality of respective computing devices associated with the one or more first players of the first team to provide a virtual reality experience, the virtual reality experience providing graphics and audio to each of the one or more first players individually to enable the one or more first players from the first team to complete the one or more checkpoints associated with the first geographical area; and
adjusting, by a flow manager executing on the server, a duration of the virtual reality experience for the first team of players within the first geographical area based on a time taken by the first team of players to complete one or more checkpoints associated with the first geographical area.

20. A system for managing flow of players through a combined physical and virtual reality experience, the system comprising:
a processor;
memory; and
one or more modules stored in memory and executable by the processor to perform operations including:
receiving position data indicating presence of one or more first players of a first team of players within a first geographical area of a plurality of geographical areas;
virtually locking, by an area manager executing on a server the first geographical area from being accessed by one or more second players from a team other than the of a second team in a second geographical area of the plurality of defined geographical areas, wherein the first geographical area is virtually locked until the first team of players completes one or more checkpoints associated with the first geographical area;
causing each of a plurality of respective computing devices associated with the one or more first players of the first team to provide a virtual reality experience, the virtual reality experience providing graphics and audio to each of the one or more first players individually to enable the one or more first players of the first team to complete the one or more checkpoints associated with the first geographical area; and
adjusting, by a flow manager executing on the server, a duration of the virtual reality experience for the first team of players within the first geographical area based on a time taken by the first team of players to complete one or more checkpoints associated with the first geographical area.

21. The system of claim 20, wherein the processor is a first processor, and wherein the system further includes:
a player computer worn by a player of the one or more first players, wherein the player computer includes a second processor and a non-transitory computer readable storage medium storing instructions that, upon execution by the second processor, causes the player computer to:
receive information from a plurality of receivers positioned on the player, wherein each receiver of the plurality of receivers receives one or more signals from one or more transmitters, and wherein each receiver of the plurality of receivers provides signal identification information and timestamp information to the player computer;
determine, based on the signal identification information, location information based on a determined location of each receiver of the plurality of receivers, and
update, based on the location information, display of the virtual reality experience to the player.

22. The system of claim 20, wherein the processor is a first processor, and wherein the system further includes:
- a first player computer worn by a first player of the one or more first players, wherein the first player computer includes a second processor and a first non-transitory computer readable storage medium storing instructions that, upon execution by the second processor, causes the first player computer to:
  - receive first information from a first plurality of receivers positioned on the first player, wherein each receiver of the first plurality of receivers receives one or more signals from one or more transmitters, and wherein each receiver of the first plurality of receivers provides first signal identification information and first timestamp information to the first player computer,
  - determine, based on the first signal identification information, first location information based on a first determined location of each receiver of the first plurality of receivers, and
  - update, based on the first location information, display of the virtual reality experience to the first player; and
- a second player computer worn by a second player of the one or more first players, wherein the second player computer includes a third processor and a second non-transitory computer readable storage medium storing instructions that, upon execution by the third processor, causes the second player computer to:
  - receive second information from a second plurality of receivers positioned on the second player, wherein each receiver of the second plurality of receivers receives one or more signals from the one or more transmitters, and wherein each receiver of the second plurality of receivers provides second signal identification information and second timestamp information to the second player computer,
  - determine, based on the second signal identification information, second location information based on a determined location of each receiver of the second plurality of receivers, and
  - update, based on the second location information, display of the virtual environment to the second player.

23. The system of claim 20, wherein the processor is a first processor, and wherein the system further includes:
- a transducer and motor coupled to a player computer worn by a player of the one or more first players; and
- the player computer worn by the player of the one or more first players, wherein the player computer includes a second processor and a non-transitory computer readable storage medium storing instructions that, upon execution by the second processor, causes the player computer to: send a signal causing activation of the transducer or motor to provide a haptic sensation to the player.

* * * * *